United States Patent
Hoetzer

(10) Patent No.: US 7,853,401 B2
(45) Date of Patent: Dec. 14, 2010

(54) DEVICE FOR SWITCHING ON AND OFF A VEHICLE ENGINE AS A FUNCTION OF THE TRAFFIC SITUATION

(75) Inventor: Dieter Hoetzer, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 12/224,408

(22) PCT Filed: Jan. 25, 2007

(86) PCT No.: PCT/EP2007/050710

§ 371 (c)(1),
(2), (4) Date: Feb. 3, 2009

(87) PCT Pub. No.: WO2007/098999

PCT Pub. Date: Sep. 7, 2007

(65) Prior Publication Data
US 2009/0312933 A1  Dec. 17, 2009

(30) Foreign Application Priority Data
Mar. 2, 2006  (DE) .................. 10 2006 009 654

(51) Int. Cl.
*G06G 7/78* (2006.01)
*G06G 7/76* (2006.01)
(52) U.S. Cl. ............... 701/115; 701/117; 701/27; 701/112; 701/300; 701/223
(58) Field of Classification Search ............ 701/115, 701/117
See application file for complete search history.

(56) References Cited

U.S. PATENT DOCUMENTS

| | | | | | |
|---|---|---|---|---|---|
| 3,710,383 | A | * | 1/1973 | Cherry et al. | 342/71 |
| 3,778,826 | A | * | 12/1973 | Flannery et al. | 342/71 |
| 4,079,802 | A | * | 3/1978 | Kawata | 180/169 |
| 6,044,321 | A | * | 3/2000 | Nakamura et al. | 701/96 |
| 6,278,360 | B1 | * | 8/2001 | Yanagi | 340/436 |
| 6,283,086 | B1 | | 9/2001 | Yamamoto et al. | |
| 6,332,108 | B1 | * | 12/2001 | Hirasago | 701/93 |
| 6,420,996 | B1 | * | 7/2002 | Stopczynski et al. | 342/70 |

(Continued)

FOREIGN PATENT DOCUMENTS

DE  100 41 789  5/2001

(Continued)

OTHER PUBLICATIONS

Manzie et al., On the potential for improving fuel economy using a traffic flow sensor network, 2005.*

*Primary Examiner*—Stephen K Cronin
*Assistant Examiner*—Raza Najmuddin
(74) *Attorney, Agent, or Firm*—Kenyon & Kenyon LLP

(57) ABSTRACT

A device for switching on and switching off an engine of a motor vehicle having a sensor for locating a preceding vehicle and a control unit for switching on and switching off the engine as a function of the state of motion of the preceding vehicle, wherein the control unit is set up to control the switching on and switching off of the engine as a function of the state of motion of at least one additional vehicle in the same lane.

9 Claims, 2 Drawing Sheets

U.S. PATENT DOCUMENTS

| | | |
|---|---|---|
| 6,597,981 B2 * | 7/2003 | Nishira et al. .................. 701/96 |
| 6,629,515 B1 | 10/2003 | Yamamoto et al. |
| 7,225,073 B2 * | 5/2007 | Hedman et al. ................ 701/93 |
| 7,319,932 B2 * | 1/2008 | Thorne ....................... 701/301 |
| 2003/0029406 A1 * | 2/2003 | Weiss ....................... 123/179.4 |
| 2007/0112494 A1 * | 5/2007 | Naik et al. .................... 701/55 |

FOREIGN PATENT DOCUMENTS

| | | |
|---|---|---|
| DE | 101 39 595 | 2/2003 |
| DE | 102 34 064 | 2/2004 |
| DE | 101 43 065 | 7/2004 |
| EP | 1 283 357 | 2/2003 |
| WO | WO 02/063163 | 8/2002 |
| WO | WO 03/001055 | 1/2003 |

* cited by examiner

DEVICE FOR SWITCHING ON AND OFF A VEHICLE ENGINE AS A FUNCTION OF THE TRAFFIC SITUATION

FIELD OF THE INVENTION

The present invention relates to a device for switching on and off an engine of a motor vehicle having a sensor for locating a preceding vehicle and a control unit for switching on and off the engine as a function of the state of motion of the preceding vehicle.

BACKGROUND INFORMATION

A device is described in German Patent No. DE 101 39 595 in which the state of motion of the preceding vehicle, that is, the vehicle that is located immediately in front of the host vehicle, is detected with the aid of a radar sensor. If both the preceding vehicle and the host vehicle are stationary and the host vehicle remains stationary longer than a predefined time span, the engine is automatically switched off. If it is then established with the aid of the radar sensor that the preceding vehicle has been set in motion again, the engine is automatically restarted. This device thus makes it possible to save a considerable amount of fuel at a high level of comfort to the driver in stop and go situations in a traffic jam, for example. In this instance, the decision regarding the switching on and off of the engine does not need to be exclusively a function of the state of motion of the preceding vehicle, but may additionally be a function of other parameters, for example, the state of motion of other motor vehicles that are located in adjacent lanes (vehicles driving away in the adjacent lane generally indicate that a traffic jam is clearing up) or also the state of a traffic signal (traffic light) that is detected with the aid of a video system.

The engine of the motor vehicle is usually an internal combustion engine for which the starting operation requires a certain amount of time. Since with the aid of the known device the starting operation is initiated only when a movement of the preceding vehicle is detected, undesired delays may occur when a traffic jam is clearing up. On the other hand, there may also be situations in which, from the standpoint of saving fuel, it is unfavorable to automatically switch off the engine. For example, this is the case if the engine must already be restarted after a standstill of less than approximately three seconds. This case also results in an undesired load on the engine starter and the vehicle battery.

SUMMARY OF THE INVENTION

An objective of the present invention is to further develop a device of the type mentioned above such that the switching on and off of the engine may occur in a way better suited to the situation.

According to the present invention, this objective is achieved by setting up the control unit to control the switching on and off of the engine as a function of the state of motion of at least one additional vehicle in the same lane.

For example, the additional vehicle may be a vehicle present immediately in front of the vehicle. If the state of motion of this vehicle in front of the preceding vehicle is taken into account, the engine is able to be started in a traffic jam situation as soon as the vehicle in front of the preceding vehicle is set in motion again. This makes it possible to avoid the undesired delay, and the host vehicle is able to drive off practically simultaneously with the immediately preceding vehicle.

A radar sensor is particularly suitable for detecting the state of motion of the vehicle in front of the preceding vehicle and, possibly, vehicles located still farther in front, since radar sensors, as they are frequently used in motor vehicles for automatic vehicle-to-vehicle ranging, are able to "tunnel under" the preceding vehicle and thus to locate the vehicle in front of the preceding vehicle even if it is hidden from the driver himself by the preceding vehicle.

However, the at least one additional vehicle whose state of motion is taken into account may also be the host vehicle, that is, the vehicle that is equipped with the device according to the present invention. To achieve the greatest possible fuel savings, it is to with useful under certain conditions, for example, when approaching an end of a traffic jam, to switch off the engine even before the host vehicle has come to a standstill. However, since modern motor vehicles are usually equipped with a brake booster whose effectiveness only continues for a limited time Tb after switching off the engine, the engine should be switched off only when it is so late that the vehicle will come to a standstill before the limited time has elapsed. The appropriate time for switching off the engine is then a function of the distance between the host vehicle and the vehicle preceding it and of the present speed of the host vehicle, that is, a function of the state of motion of the host vehicle and not only, as in the related art, of the duration of the standstill of the host vehicle.

Preferably, the control unit of the device according to the present invention takes into account both the states of motion of additional vehicles present in front of the preceding vehicle and the state of motion of the host vehicle, as well.

If, with regard to the state of motion of the host vehicle, the prerequisites for switching off the engine are fulfilled, but at that moment the vehicle in front of the preceding vehicle has already been set in motion again, it is advisable to prevent the switching-off operation to avoid a merely brief engine standstill.

DETAILED DESCRIPTION

Figure 1:
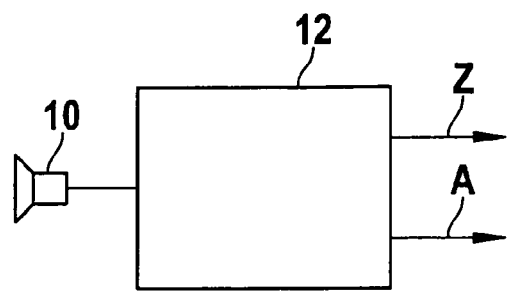
FIG. 1 shows a block diagram of the device according to the present invention.

The device shown in FIG. 1 for automatically switching on and off the engine of a motor vehicle includes a radar sensor 10 for locating vehicles in front of the host vehicle and an electronic control unit 12 that evaluates the signals of radar sensor 10 and possibly additional information characterizing the traffic situation, and as a function of this information outputs signals Z and A to the ignition system and the engine starter, or to relevant hybrid systems, to a starter generator, or the like for the vehicle, to control the starting and switching-off operations of the engine.

Figure 2:
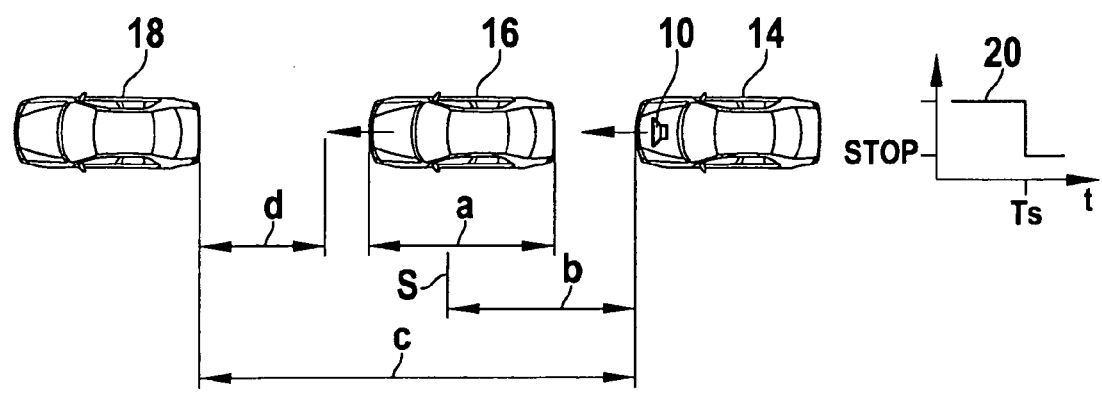
FIGS. 2 through 4 show schematic representations of traffic situations to illustrate the mode of operation of the device.

FIG. 2 illustrates a traffic situation in which a vehicle 14 equipped with the device as shown in FIG. 1 approaches a preceding vehicle 16, which in turn approaches a vehicle 18 that is already stationary in front of the preceding vehicle. Radar sensor 10 of vehicle 14 is able to measure not only the distance and the relative speed of the immediately preceding vehicle 16, but also the distance and the relative speed of vehicle 18 in front of the preceding vehicle. Control unit 12 therefore recognizes that vehicle 18 in front of the preceding vehicle is stationary. It is to be inferred from the standstill of this vehicle that preceding vehicle 16 also will stop a suitable distance behind vehicle 18 in front of the preceding vehicle and ultimately that host vehicle 14 must also come to a standstill a suitable distance from preceding vehicle 16. In this situation, control unit 12 thus calculates a suitable time Ts for switching off the engine of vehicle 14.

The corresponding time characteristic of a switch-off signal 20 is shown in diagram form in FIG. 2. This switch-off signal 20 first has a high value corresponding to the switched on state of the engine and then declines to value STOP at time Ts. In this instance, let it be assumed that vehicle 14 is equipped with a brake booster that is dependent on energy supplied by the running engine of the vehicle, at least during longer periods of operation. If the engine is switched off, the brake booster is able to maintain its operation for a limited duration of activity Tb. The calculation of the switch-off time Ts now takes place with the proviso that vehicle 14 must come to a standstill at a stopping point S before the limited activity duration Tb of the brake booster has elapsed.

If a is the length of preceding vehicle 16 (in practice, a fixed value corresponding to the typical length of a passenger vehicle may be assumed for a), b the present distance between vehicle 14 and stopping point S, c the present distance between vehicle 14 and vehicle 18 in front of the preceding vehicle, and d the usual stopping distance between vehicles in a stationary column (typically 3 m), then the following relationship is valid:

$$b=c-a-2d.$$

If v is the present speed of vehicle 14 and one assumes a constant braking deceleration until the standstill of vehicle 14, then the following is valid for the remaining stopping time Ta of vehicle 14:

$$Ta=2*b/v.$$

The condition required so that the brake booster may still be effective during the entire stopping time Ta reads:

$$Ta<Tb$$

or equivalent:

$$Ta+Td \leq Tb,$$

with a suitable safety time supplement Td.

In the formulas specified above, the variables b, c, and v, and consequently also Ta, are time-dependent functions. Control unit 12 may now determine switch-off time Ts in that control unit 12 calculates stopping time Ta cyclically with the aid of the current values for b, c, and v, and checks to see whether the condition Ta+Td≦Tb is fulfilled, for example. In the event of large distances c, this will not yet be the case. If the above-mentioned condition is fulfilled for the first time, control unit 12 outputs a signal for switching off the engine.

In an analogous way, control unit 12 is able to control the switching off of the engine if vehicle 18 in front of the preceding vehicle is not present, but preceding vehicle 16 is stationary. In this case, stopping time Ta is to be calculated as a function of the distance between vehicle 14 and stationary preceding vehicle 16 and stopping distance d.

In this way, it is ensured that in traffic situations in which a switching off of the engine is appropriate, this switching off occurs in each instance at the earliest possible point in time.

Figure 3:
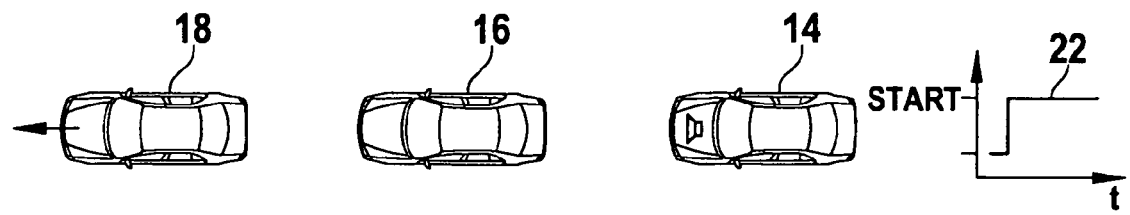

FIG. 3 illustrates a traffic situation in which a traffic jam clears up. Vehicle 18 in front of the preceding vehicle has already been set in motion while preceding vehicle 16 and host vehicle 14 are still stationary. In this situation, control unit 12 recognizes that vehicle 18 in front of the preceding vehicle is driving away and consequently starts the engine immediately so that vehicle 14 is ready to drive away as soon as preceding vehicle 16 is also set in motion. A corresponding actuation signal 22 for switching on the engine is shown in FIG. 3, again in diagram form. As soon as it is recognized that vehicle 18 in front of the preceding vehicle is driving away, this signal takes on a high value START.

Figure 4:
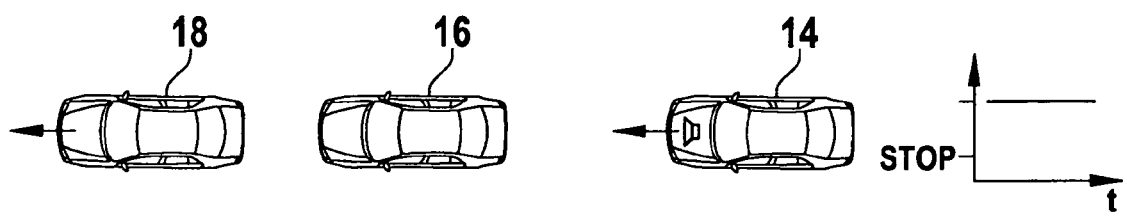

FIG. 4 illustrates a situation in which vehicle 14 approaches an end of a traffic jam, as in FIG. 2, the traffic jam already beginning to clear up, however. Vehicle 18 in front of the preceding vehicle has already been set in motion again while preceding vehicle 16 is still stationary. Host vehicle 14 is approaching preceding vehicle 16, and its engine is not yet switched off. In this situation, control unit 12 recognizes that vehicle 18 in front of the preceding vehicle has already driven away again, and under this condition, the calculation of a switching off time that is provided per se for switching off the engine of motor vehicle 14 is prevented, since it is to be assumed that preceding vehicle 16 too will soon be set in motion again so that host vehicle 14 is also able to continue driving. In this way, an uneconomical short-term switching off of the engine is prevented.

What is claimed is:

1. A device for switching on and off an engine of a motor vehicle, comprising:
   a sensor for locating a preceding vehicle; and
   a control unit for switching on and off the engine as a function of a state of motion of the preceding vehicle, the control unit controlling the switching on and off of the engine as a further function of a state of motion of at least one additional vehicle in a same lane;
   wherein the at least one additional vehicle includes a vehicle, located by the sensor, in front of the preceding vehicle, and
   wherein the at least one additional vehicle includes a host vehicle equipped with the device, and the control unit is adapted to switch off the engine already before the host vehicle has come to a standstill if the preceding vehicle and/or the vehicle in front of the preceding vehicle is stationary.

2. The device according to claim 1, wherein the sensor is a radar sensor.

3. The device according to claim 1, wherein the control unit is adapted to switch on the engine or, if the engine is still switched on, to prevent the switching off of the engine if the vehicle in front of the preceding vehicle is in motion.

4. The device according to claim 1, wherein the device is contained in a motor vehicle having a brake booster that remains ready for use for a limited activity duration after the engine has been switched off, and wherein the control unit is adapted to calculate a switching off time for the engine such that, after the engine has been switched off, if a brake continues to be operated, the host vehicle comes to a standstill at a stopping point before the activity duration has elapsed.

5. The device according to claim 4, wherein, when a vehicle in front of the preceding vehicle is located, the control unit is adapted to calculate the stopping point as a function of a distance to the vehicle in front of the preceding vehicle.

6. The device according to claim 1, wherein the engine is configured to be switched on in a traffic jam situation as soon as the preceding vehicle is set in motion again.

7. The device according to claim 2, wherein the radar is configured to tunnel under the preceding vehicle and locate the at least one additional vehicle in the same lane.

8. The device according to claim 1, wherein a time for switching off the engine is a function of the distance between the host vehicle, the preceding vehicle, and the present speed of the host vehicle.

9. The device according to claim 1,
wherein the device is contained in a motor vehicle having a brake booster that remains ready for use for a limited activity duration after the engine has been switched off,
wherein the control unit is adapted to calculate a switching off time for the engine such that, after the engine has been switched off, if a brake continues to be operated, the host vehicle comes to a standstill at a stopping point before the activity duration has elapsed, and
wherein a time for switching off the engine is a function of the distance between the host vehicle, the preceding vehicle, and the present speed of the host vehicle.

* * * * *